US 7,191,449 B2

(12) United States Patent
Burgess

(10) Patent No.: US 7,191,449 B2
(45) Date of Patent: Mar. 13, 2007

(54) SYSTEM AND METHOD FOR PROVIDING COMPONENTIZED TRANSPORTS AND FORMS

(75) Inventor: Gregory M. Burgess, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 556 days.

(21) Appl. No.: 09/785,942

(22) Filed: Feb. 16, 2001

(65) Prior Publication Data

US 2002/0156936 A1    Oct. 24, 2002

(51) Int. Cl.
G06F 3/00    (2006.01)
(52) U.S. Cl. ........................ 719/313; 709/206
(58) Field of Classification Search .................... 714/4, 714/43, 57; 709/224, 204, 217–219, 328, 709/203, 206, 202, 227, 228; 719/313–320, 719/328–329; 455/466, 412.1, 412.2, 456.2
See application file for complete search history.

(56) References Cited

U.S. PATENT DOCUMENTS

| 6,023,708 | A  | * | 2/2000 | Mendez et al. ............. 707/203 |
| 6,057,841 | A  |   | 5/2000 | Thurlow et al. ............ 345/347 |
| 6,078,820 | A  | * | 6/2000 | Wells et al. ................ 455/466 |
| 6,173,316 | B1 | * | 1/2001 | De Boor et al. ............ 709/218 |
| 6,343,318 | B1 | * | 1/2002 | Hawkins et al. ............ 709/219 |
| 6,370,566 | B2 | * | 4/2002 | Discolo et al. ............. 709/206 |
| 6,421,717 | B1 | * | 7/2002 | Kloba et al. ................ 709/219 |
| 6,463,304 | B2 | * | 10/2002 | Smethers .................... 455/566 |
| 6,463,463 | B1 | * | 10/2002 | Godfrey et al. ............ 709/206 |
| 6,466,236 | B1 | * | 10/2002 | Pivowar et al. ............ 715/835 |
| 6,526,274 | B1 | * | 2/2003 | Fickes et al. ............. 455/414.1 |
| 6,563,919 | B1 | * | 5/2003 | Aravamudhan et al. .... 379/230 |
| 6,606,649 | B1 | * | 8/2003 | Schwitters et al. ........ 709/206 |
| 6,611,254 | B1 | * | 8/2003 | Griffin et al. ............... 345/169 |
| 6,636,983 | B1 | * | 10/2003 | Levi ............................. 714/4 |
| 6,643,650 | B1 | * | 11/2003 | Slaughter et al. ........... 707/10 |
| 6,694,336 | B1 | * | 2/2004 | Multer et al. .............. 707/201 |
| 6,741,855 | B1 | * | 5/2004 | Martin et al. .............. 455/419 |
| 6,779,019 | B1 | * | 8/2004 | Mousseau et al. ......... 709/206 |
| 2003/0200254 | A1 | * | 10/2003 | Wei ............................ 709/203 |

FOREIGN PATENT DOCUMENTS

WO    WO 97/22928    6/1997
WO    WO 99/22324    5/1999

OTHER PUBLICATIONS

"CDO & MAPI Programming with Visual Basic" published by Dave Grudgeiger, Oct. 2000.*

(Continued)

*Primary Examiner*—Larry D. Donaghue
*Assistant Examiner*—Mohammad Siddiqi
(74) *Attorney, Agent, or Firm*—Merchant & Gould P.C.; Ryan T. Grace

(57) ABSTRACT

Described is a system and method for managing and displaying messages within a mobile device. The invention provides a method for centrally controlling data flow throughout the communication system. The invention provides a means to receive a message over a communications medium, identify a registered form to handle the message, and to pass it to the registered form for display.

20 Claims, 6 Drawing Sheets

OTHER PUBLICATIONS

LaPorta et al., "Challenges for nomadic computing: Mobility management and wireless communications," *Mobile Networks and Applications*, Aug. 1996, pp. 3-16.

Jacobsen et al., "Ubiquitous Devices United: Enabling Distributed Computing Through Mobile Code," *Proceedings of the 1999 ACM symposium on Applied computing*, 1999, pp. 399-404.

Bhagwat et al., "BlueSky: A Cordless Networking Solution for Palmtop Computers," *Proceedings of the fifth annual ACM/IEEE international conference on Mobile computing and networking*, 1999, pp. 69-76.

Tom Sheldon, "MAPI Blooms in Chicago," *JSB Corporation*, Nov. 1994, 8 pgs.

Tso et al., "Always On, Always Connected Mobile Computing," *Intel Corporation*, Apr. 1996, pp. 918-924.

* cited by examiner

SYSTEM AND METHOD FOR PROVIDING COMPONENTIZED TRANSPORTS AND FORMS

FIELD OF THE INVENTION

The present invention relates generally to computer-executable software, and more particularly to sending a message across multiple transport protocols.

BACKGROUND OF THE INVENTION

Consumer electronics of almost any size now include controllers or processors and perform many functions that used to be exclusively within the domain of the desktop computer. One such device, the cellular phone, previously dedicated to transmitting only voice communication, is now being utilized to transmit other data in addition to voice communication. Some cellular phones now allow users to connect to the Internet and browse web sites; other cellular phones now allow users to check and send email. However, power consumption and available memory, place size and resource constraints on mobile devices, such as cellular phones, that do not exist on desktop computers.

The traditional model of building monolithic applications for the desktop world creates difficulties when adapted to mobile computing. Until now, the size and resource constraints of mobile devices have made an acceptable communications mechanism unascertainable to the developers of mobile communications.

SUMMARY OF THE INVENTION

The present invention provides a system and method for managing communication messages on a mobile device with a group of interactive and modularized components. The invention provides an email application for mobile devices that heretofore had been integrated and non-extensible, allowing them to become modular and extensible. The resultant communication system allows easy accessorizing by developers. Furthermore, the invention provides a method for centrally controlling data flow throughout the communication system.

In one aspect of the invention, an application is in communication with a data storage component, a message form, a transport, and a data store. The application, the message form and the transport each communicate using a standardized set of Application Programming Interfaces (APIs) to pass information back and forth. The standardized set of APIs enables developers the flexibility to create modularized components for performing specialized functions of the communication system, thereby avoiding the monolithic approach to application development. In this way, the communication system may be more easily tailored for specific applications without unduly burdening the limited resources of a mobile device.

The invention simplifies controlling a messaging system by dividing particular functionality among several components rather than integrating all the functionality in a single component. In addition, each component can use the standardized set of APIs to communicate. These simplifications improve the ability of outside vendors to add new components to the system.

DETAILED DESCRIPTION OF THE PREFERRED EMBODIMENT

The present invention provides a system and method for facilitating the management of messages within an electronic device. Among other things, disclosed is a system that standardizes the interaction of components of a mobile device messaging system. The system allows the mobile device messaging system to be modular and extensible. This system is beneficial in a reduced memory capacity environment.

Illustrative Operating Environment

Figure 1:
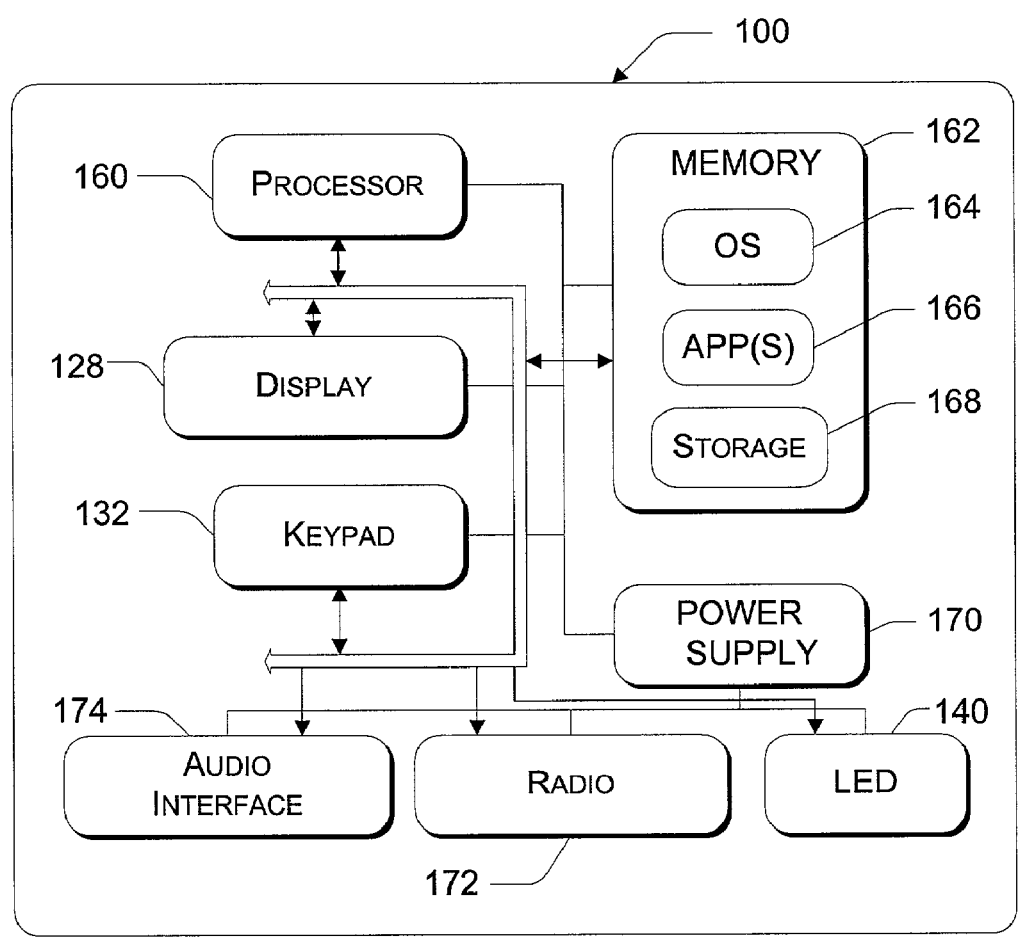
FIG. 1 is a functional block diagram illustrating functional components of a mobile computing device that may be adapted to implement one embodiment of the present invention.

FIG. 1 is a functional block diagram illustrating functional components of a mobile computing device 100. The mobile computing device 100 has a processor 160, a memory 162, a display 128, and a keypad 132. The memory 162 generally includes both volatile memory (e.g., RAM) and non-volatile memory (e.g., ROM, Flash Memory, or the like). The mobile computing device 100 includes an operating system 164, such as the Windows CE operating system from Microsoft Corporation or other operating system, which is resident in the memory 162 and executes on the processor 160. The keypad 132 may be a push button numeric dialing pad (such as on a typical telephone), a multi-key keyboard (such as a conventional keyboard), or other such input device, which would function in the required fashion. The display 128 may be a liquid crystal display, or any other type of display commonly used in mobile computing devices. The display 128 may be touch sensitive, and would then also act as an input device.

One or more application programs 166 are loaded into memory 162 and run on the operating system 164. Examples of application programs include phone dialer programs, email programs, scheduling programs, PIM (personal information management) programs, word processing programs, spreadsheet programs, Internet browser programs, and so forth. The mobile computing device 100 also includes non-volatile storage 168 within the memory 162. The non-volatile storage 168 may be used to store persistent information which should not be lost if the mobile computing device 100 is powered down. The applications 166 may use and store information in the storage 168, such as e-mail or other messages used by an e-mail application, contact information used by a PIM, appointment information used by a scheduling program, documents used by a word processing application, and the like. A synchronization application also resides on the mobile device and is programmed to interact with a corresponding synchronization application resident on a host computer to keep the information stored in the storage 168 synchronized with corresponding information stored at the host computer.

The mobile computing device 100 has a power supply 170, which may be implemented as one or more batteries. The power supply 170 might further include an external power source, such as an AC adapter or a powered docking cradle that supplements or recharges the batteries.

The mobile computing device 100 is also shown with two types of external notification mechanisms: an LED 140 and an audio interface 174. These devices may be directly coupled to the power supply 170 so that when activated, they remain on for a duration dictated by the notification mechanism even though the processor 160 and other components might shut down to conserve battery power. The LED 140 may be programmed to remain on indefinitely until the user takes action to indicate the powered-on status of the device. The audio interface 174 is used to provide audible signals to and receive audible signals from the user. For example, the audio interface 174 may be coupled to a speaker for providing audible output and to a microphone for receiving audible input, such as to facilitate a telephone conversation.

The mobile computing device 100 also includes a radio 172 that performs the function of transmitting and receiving radio frequency communications. The radio 172 facilitates wireless connectivity between the mobile computing device 100 and the outside world, via a communications carrier or service provider. Transmissions to and from the radio 172 are conducted under control of the operating system 164. In other words, communications received by the radio 172 may be disseminated to application programs 166 via the operating system 164, and vice versa.

Illustrative Message Organizing System

Figure 2:
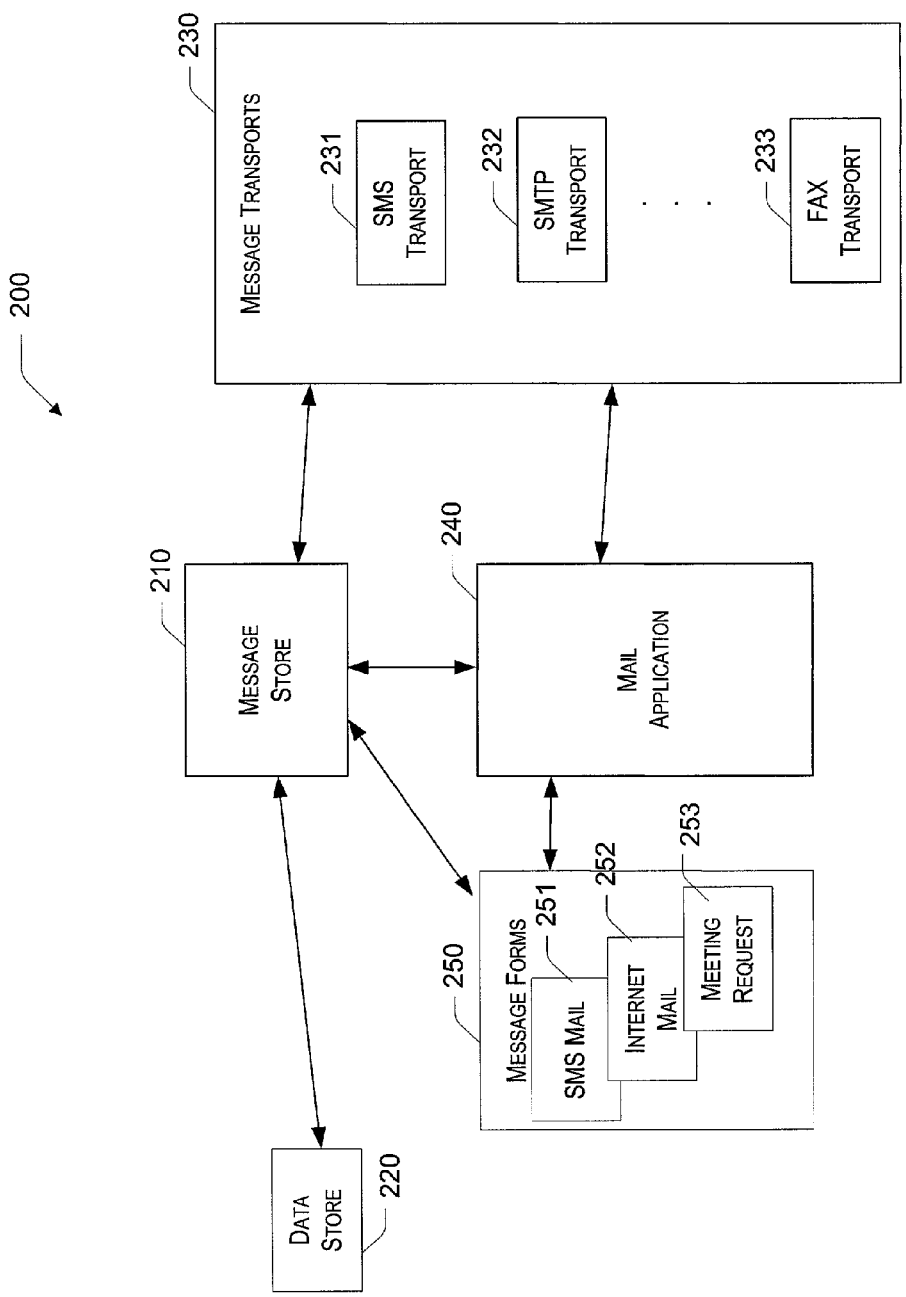
FIG. 2 is a functional block diagram illustrating a system adapted to organize and distribute messages.

FIG. 2 is a functional block diagram illustrating a system 200 adapted to organize and distribute messages within a mobile device, according to one embodiment of the invention. Messaging system 200 includes message store 210, data store 220, transport component 230, mail application 240, and form component 250.

Message store 210 is a software component, which acts as a mapping layer between components of a first message format (e.g., MAPI) and components of a second message format (e.g., Windows CE Database format). Additionally, the message store acts as a principal notifier to the other components of events that occur in system 200. Data store 220 is a software component which acts as a storage area for data in the system. Data store 220 may include a local mail store, a local contacts store, and the like. The data store 220 receives and stores message data from the message store 210.

Transport component 230 is illustrated in detail in FIG. 4, and described below. Briefly described, transport component 230 includes several specialized message transports, each programmed to communicate with local components in MAPI format, and with external devices via particular protocols (e.g., SMS, SMTP, FAX, etc.). Transport component 230 includes transports 231, 232, and 233. Although only three transports are shown, it will be understood that more transports could be added or transports could be removed without departing from the spirit and scope of the invention. For example, SMS transport 231 is a software component, interfaced to receive messages in SMS format. SMTP transport 232 is another software component interfaced to transmit messages in SMTP format. Additional transports 233 might be interfaced to receive any of several different communication formats such as, for example, fax data transmission, POP3, IMAP, or the like.

Mail application 240 is illustrated in detail in FIG. 3 and 4, and described below. Briefly described, mail application 240 is an application software component that acts as a principal interface between the user and the system. The mail application 240 is programmed to control a special function, such as e-mail usage or contacts maintenance. As shown, the mail application 240 interacts with the message store 210, the message forms 250, and the transports 230. It should be noted that while the user primarily interfaces with the messaging system 200 through the mail application 240, there may be numerous applications running concurrently with the input component, such as, a word processor, calendar, etc. These other applications are not detailed here, as they are not pertinent to the present invention, as it exists in its present form, although they may support it or be supported by it presently or in the future.

Form component 250 is illustrated in detail in FIG. 3, and described below. The form component 250 includes forms 251, 252, and 253. Although only three forms are shown, it will be understood that more forms could be added or forms could be removed without departing from the spirit and scope of the invention. Briefly described, the form component 250 is a group of special display forms that each perform a specialized function with respect to displaying messages. In other words, each form is a software component that may be programmed to either display information for or to receive information from the user. For instance, SMS form 251 allows the viewer to receive and to view messages in SMS format. Likewise, internet mail form 252 is a message form that allows the user to receive and to view internet messages. Similarly, meeting request form 253 allows the user to receive and view meeting requests. Additional forms might represent any number of different forms that may be instantiated by the input component 240 such as, for example, fax message, deleted messages, or the like.

Each of the several components, except the data store 220, communicate with each other using a standardized set of messaging interfaces, such as MAPI or a subset of MAPI. The several standardized interfaces are specified below in conjunction with a discussion of the particular interface. These features provide the advantage of reducing the duplication of resource and simplifying the development of additional modules, which helps conserve space.

Figure 3:
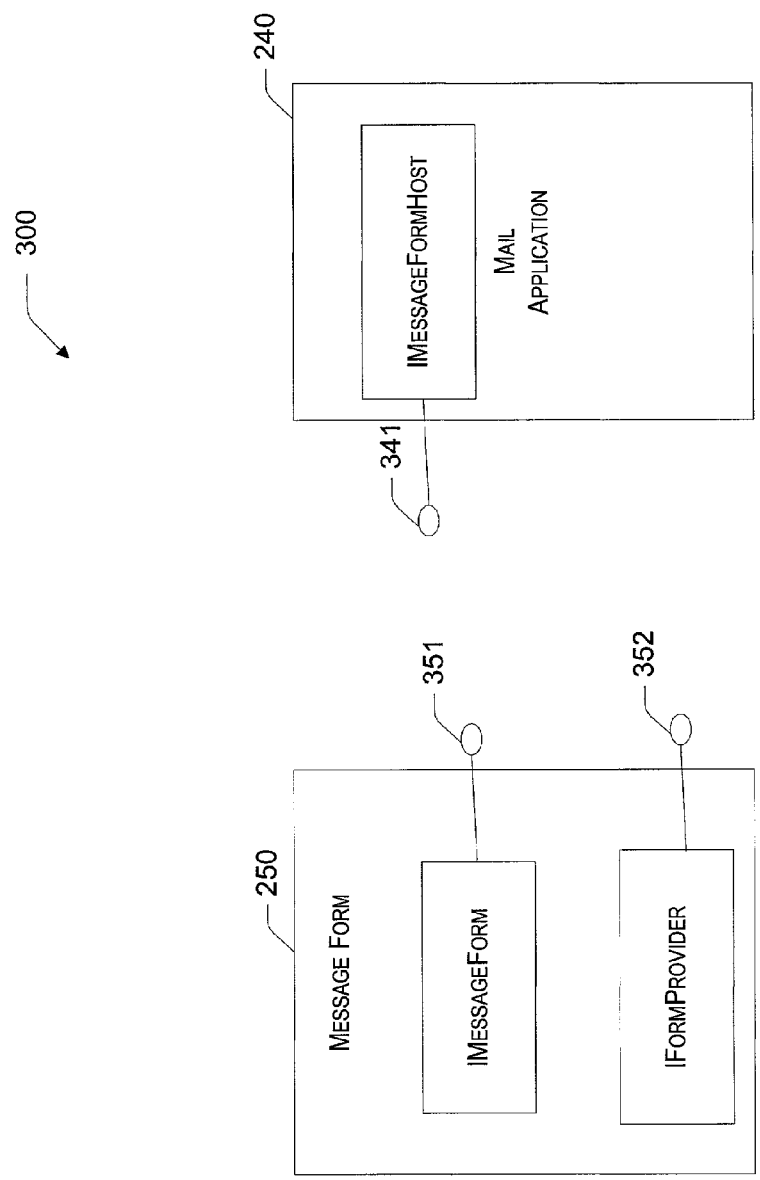
FIG. 3 is a functional block diagram illustrating a subsystem of the system illustrated in FIG. 2, including a mail application and message form, and focusing on the relationship of these two components, in accordance with one embodiment of the present invention.

FIG. 3 is a functional block diagram illustrating a subsystem 300 of system 200 including mail application 240 and message form 250, and focusing on the relationship of these two components. Mail application 240 includes interfaces, which it exposes to the message form 250 to allow message form 250 to communicate instructions to mail application 240. Although only a single interface is shown, it will be understood that more interfaces could be added without departing from the spirit and scope of the invention. Each interface includes several methods, of which each performs a specific operation. When a message form 250 calls an interface, the mail application 240 executes the identified method.

In a preferred embodiment, mail component 240 exposes an IMessageFormHost interface 341. The IMessageFormHost interface 341 includes methods that allow it to fulfill the aforementioned actions. The ImessageFormHost interface 341, and its methods, are generally described through the following pseudocode:

```
{
public:
    virtual HRESULT GetParentHWND(HWND* phwnd)__PURE
    enum eMsgStatus {
        eNotAvailable = 0,
        eSent = 1,
        ePostponed = 2,
        eDelete = 3,
        eDeletePermanently = 4
    };
    virtual HRESULT FormClosing(IMessageForm* pform,
            IMessage* pMsg, eMsgStatus eMsgStat)__PURE;
    //This host method is the same one provided as part of
    IMailSyncCallBack.
    MAPIMETHOD(GetGlobalSetting)(LPCWSTR pszSetting,
    LPSPropValue pval)
    __PURE;
    MAPIMETHOD(SetGlobalSetting)(LPCWSTR pszSetting,
    LPSPropValue pval)
    __PURE;
    enum actions {
        actNull = 0,
        actFirst = 0,
        actReplyTo = 1,
        actReplyToAll = 2,
        actForward = 3,
        actDelete = 4,
        actClose = 5,
        actMoveToFolder = 6,
        actGotoNextMessage = 7,
        actGotoPrevMessage = 8,
        actComposeNew = 9,
        actGetFullMessage = 10,
        actViewAttachment = 11,
        actReplyWith = 12,
        actShow = 13,
        actLast
    };
    virtual HRESULT DoAction(IMessageForm* pform,
    IMessage* pmsg,
            actions act, LPARAM lParam)__PURE;
    virtual HRESULT CreateNewMessage(IMessage** ppmsg)__PURE;
};
```

The methods above allow message form 250 to communicate several different instructions to mail application 240. For instance, one method listed above, FormClosing, allows message form 250 to tell mail application 240 that the form is closing. This allows mail application 240 to prepare to be the foreground window again, and also to release any handles to message form 250 that is closing.

Methods GetGlobalSettings and SetGlobalSettings allow message form 250 to determine settings, such as whether or not to include the original text of a message when replying. The DoAction method allows message form 250 to tell the mail application to do something (see above pseudocode, including enumerators). Message form 250 can use this method to forward a message, reply to it, go to the next message in the list mail application 240 is displaying, etc. Message form 250 can also request that the application create a new mail message.

Message form 250 also exposes a standardized set of interfaces. Although only two interfaces are shown, it will be understood that more interfaces could be added to or interfaces could be removed from message form 250 without departing from the spirit and scope of the invention. Each interface includes several methods, of which each performs a specific operation, any of which may be the reason the interface is called.

In this embodiment, message form 250 includes IMessageForm interface 351 and IFormProvider interface 352. The IMessageForm interface 351 is generally described by the following pseudocode:

```
class IMessageForm : public IUnknown
{
public:
    MAPIMETHOD (Activate)(
    )__PURE;
    MAPIMETHOD (ShowForm)(
        ULONG ulAction
    )__PURE;
    MAPIMETHOD(SetMessage)(
        WORD        wType,
        LPMESSAGE   pmsg
    )__PURE;
    MAPIMETHOD (CloseForm)(
                    BOOL fSave=FALSE
    )__PURE;
    MAPIMETHOD (PreTranslateMsg)(
        MSG* pmsg,
        BOOL* pfProcessed    // Set TRUE if the message taken
    )__PURE;
    MAPIMETHOD (GetActiveMessage)(
        LPMESSAGE* ppmsg
    )__PURE;
    MAPIMETHOD (OnMessageModified)(
        ULONG        cbId,
        LPENTRYID    pid,
        LPSPropTagArray  props
    )__PURE;
    MAPIMETHOD (SetCaptionText) (LPCWSTR psz
    )__PURE;
};
```

The methods above allow mail application 240 to communicate several different instructions to message form 250. For example, Activate( ) method allows the mail application 240 to tell the message form 250 to "take control" of the device, that is, it will become the active "window", accepting all keyboard input.

Another method is ShowForm( ), which is used by the mail application 240 to tell the message form 250 to make itself visible or not visible depending on the parameter passed to it. In one actual embodiment ShowForm( ) accepts the same parameters as the Win32 ShowWindow( ) API.

Yet another method is SetMessage( ), which is used to set the message object that the message form 250 is to display. In one actual embodiment, once a form is displayed on the screen, this method can be used to switch the message that is being displayed to the user, without having to create a new form. This results in a significant reduction in resources and a corresponding increase in performance. Also, SetMessage( ) is used to set the initial message object that a message form 250 is to display.

Still another method is CloseForm( ), which is used to tell a message form to close or exit. The method PreTranslateMsg( ) is used to help with keyboard accelerators, for example, in the Win32 environment.

Yet another method is GetActiveMessage( ), which is used to determine the message object that a message form 250 is currently displaying.

Still yet another method is SetCaptionText( ), which allows the mail application 240 to override the text on the title or task bar of the device. This exists mainly for the implementation on the Smart Phone, but isn't critical to the idea of the invention The IFormProvider interface 352 is exposed by a message form 250 dynamic link library (DLL). It primarily performs the function of determining the icon to illustrate in the "message list" of the mail application. Additionally, IForm-Provider interface 352 creates read forms and compose forms, both of which are members of the message form group 250 of special display forms discussed above. The IFormProvider interface 352 is generally described by the following pseudocode:

```
class IFormProvider : public IUnknown
{
public:
    enum FORMTYPE {
        kfNewMsg = 0,
        kfReply = 1,
        kfReplyToAll = 2,
        kfForward = 3,
        kfLoad = 4,
        kfReplyWith = 5
    };
    MAPIMETHOD (GetMsgStatusIconIndex)(
        LPMAPIFOLDER    pfldr,          // Folder for message
        LPENTRYID       pid,            // Id of message
        ULONG           cbid,           // count of bytes for the Id
        ULONG           ffFlags,        // Flags for the message
        ULONG           ffStatus,       // Status for the message
        LPCWSTR         pszMsgClass,
        ULONG           cAttachments,
        ULONG*          pnIndex         // OUT: Idx for correct glyph
    )_PURE;
    MAPIMETHOD (ComposeMessageForm)(
        IMessageFormHost* phost,
        LPMESSAGE       pmsg,           // Object to compose
        IMessageForm**  ppForm,         // Form object
        BOOL            fDeleteOnClose, // TRUE if we delete pmsg
                                        //when the user cancels.
        WORD            wIdType,        // Reply, Reply All, Forward
        LPMESSAGE       pMsgBase,       // Message to prefill the form
                                        //if necessary
        LPARAM          lParam          // Extra data allowing Read
                                        //forms to pass info
                                        //to new compose form.
    )_PURE;
    MAPIMETHOD (CreateReadForm)(
        IMessageFormHost* pHost,
        IMessageForm** ppForm,
        LPMESSAGE pmsg
    )_PURE;
};
```

Mail application 240 calls the IFormProvider interface 352 and its associated methods to communicate a requirement to message form 250. Methods called include GetActiveMessage( ), to determine the message object that a form is currently displaying, and SetCaptionText ( ) allowing the mail application 240 to override the text on the title or task bar of the device.

Another method is GetMsgStatusIconIndex, which is used by the mail application 240 to determine the icon that is placed in the list of messages that mail application 240 presents. This allows customizable icons in the list of messages. (i.e. Meeting Requests would get a different icon than regular messages).

Yet another method, ComposeMessageForm( ), is used to request a new compose form object from the message form 250. This method creates a new ImessageForm object that would allow editing or modifying the message object passed to it. In one actual embodiment, the form is not visible after creation. The mail application 240, after creating the form, calls the ImessageForm::ShowForm( ) method to make the new form visible. Still yet another method is CreateReadForm( ), which is used to create a new message form for reading messages.

Figure 4:
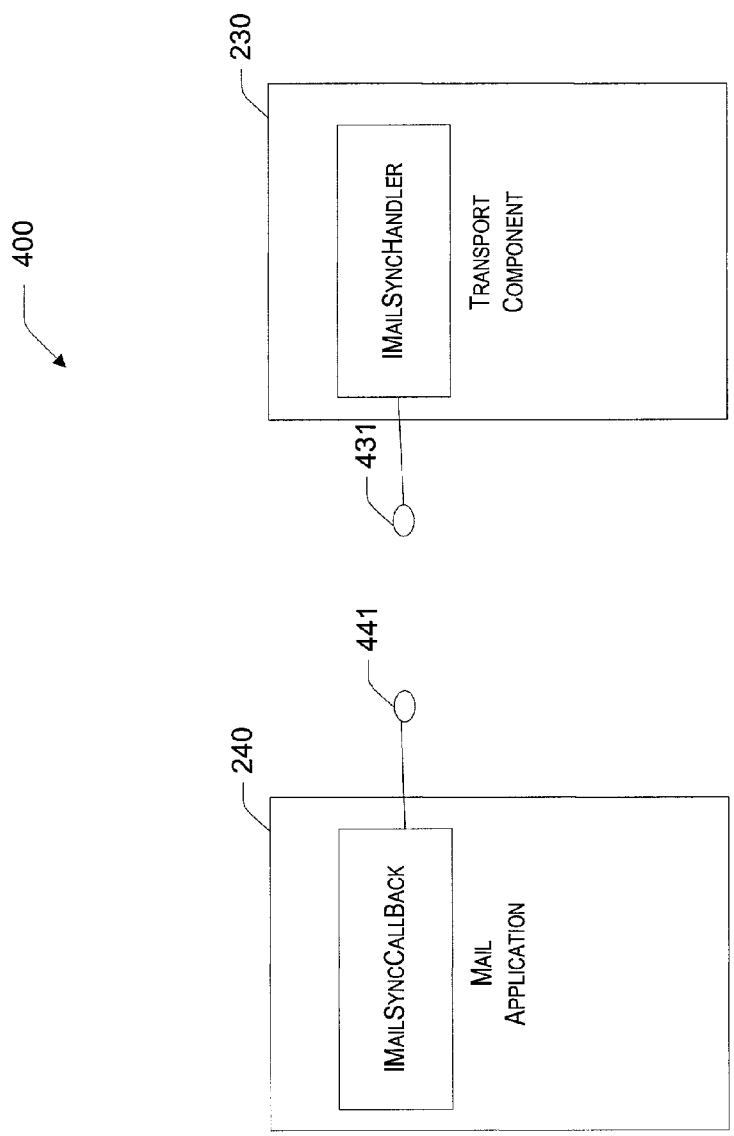
FIG. 4 is a functional block diagram illustrating a subsystem of the system illustrated in FIG. 2, including a mail application and a transport component, and focusing on the relationship of these two components, in accordance with one embodiment of the present invention.

FIG. 4 is a functional block diagram illustrating a subsystem 400 of system 200 including mail application 240 and transport component 230, and focusing on the relationship of these two components. Mail application 240 exposes interfaces that allow transport component 230 to communicate instructions to mail application 240. Additionally, although only a single interface is shown, it will be understood that more interfaces could be added without departing from the spirit and scope of the invention.

In a preferred embodiment, mail application 240 includes IMailSyncCallBack interface 441, generally described in the following pseudocode.

```
class IMailSyncCallBack : public IUnknown
{
public:
    MAPIMETHOD (RequestSync)(
        LPCWSTR pszProfile,
        DWORD cbCookie,
        LPBYTE pbCookie
    )_PURE;
    MAPIMETHOD (Progress)(
```

-continued

```
            LPCWSTR    pszProfile,
            SYNCPROGRESSITEM* pinfo
            )_PURE;
    MAPIMETHOD (GetGlobalSetting)(
            LPCWSTR    pszSetting,
            LPSPropValue pval
            )_PURE;
    MAPIMETHOD_(UINT, DisplayMessageBox)(
            LPCWSTR    pszProfile,
            LPCWSTR    pszTitle,
            LPCWSTR    pszMessage,
            UINT nFlags
            )_PURE;
    MAPIMETHOD (RequestCredentials)(
            LPCWSTR    pszProfile,
            SYNCCREDENTIALS* ppcredsSource,
            SYNCCREDENTIALS** ppcreds
            )_PURE;
    MAPIMETHOD (LogEvent)(
            TRANSPORTEVENT* pevt
            )_PURE;
    MAPIMETHOD (AllocateMem)(
            DWORD cbSize,
            LPBYTE* ppb
            )_PURE;
    MAPIMETHOD (FreeMem)(
            LPVOID pvmem
            )_PURE;
};
```

Transport component 230 (such as IMAP or POP) uses the IMailSyncCallBack interface 441 to inform the mail application 240 of status changes and progress. Additionally, the IMailSyncCallBack interface 441 can be used to report errors or events which occur, to the mail application 240, allowing the mail application 240 to display the error or event. Transport component 230 may also use the IMailSyncCallBack interface 441 to request that a message be displayed to the user of the mail application 240.

Further, transport component 230 may use the IMailSyncCallBack interface 441 to request authentication credentials from the mail application 240 for an account. This request allows the mail application 240 to be a common clearing house and safe repository of account data, freeing the transport component 230 of this responsibility. Additionally, the IMailSyncCallBack interface 441 can be used to request global messaging settings as well as to allocate and free shared memory buffers between transport component 230 and mail application 240.

In this embodiment, the transport component 230 exposes an ImailSyncCallHandler interface 441, described by the following pseudocode.

```
class IMailSyncHandler : public IUnknown
{
public:
    MAPIMETHOD (Initialize)(
            IMailSyncCallBack* pCallBack,
            LPCWSTR pszProfileName,
            IMsgStore* pMsgStore
            )_PURE;
    MAPIMETHOD (ShutDown)(
            DWORD dwReserved
            )_PURE;
    MAPIMETHOD (Synchronize)(
            MAILSYNCREQUEST* pRqst
            )_PURE;
    MAPIMETHOD (DoProperties)(
            HWND hwndParent
            )_PURE;
```

-continued

```
    MAPIMETHOD (GetCapability)(
            LPCWSTR     pszName,
            LPSPropValue pval
            )_PURE;
    MAPIMETHOD(SetCapability)(
            LPCWSTR     pszName,
            LPSPropValue pval
            )_PURE;
    MAPIMETHOD(Install)(
            LPCWSTR    pszProfileName,
            LPCWSTR    pszIncomingServer,
            LPCWSTR    pszOutgoingServer,
            GUID*      pidNetwork
            )_PURE;
    MAPIMETHOD (UnInstall)(
            _PURE;
    MAPIMETHOD (DecodeEvent)(
            TRANSPORTEVENT* pevt,
            LPWSTR* ppszEvent
            )_PURE;
    MAPIMETHOD (Get FolderHierarchy)(
            FOLDERNODE** ppRootNode
            )_PURE;
    enum FOLDEROPTIONS {
            koptNA = 0,
            koptDownload,
            koptQueryDownload,
            koptGetRemotePath,
            koptCreate,
            koptQueryCreate,
            koptSetAge,
            koptSetBodyFetchSize,
            koptSetAttachFetchSize,
            koptGetAge,
            koptGetBodyFetchSize,
            koptGetAttachFetchSize,
    };
    MAPIMETHOD (SetFolderOptions)(
            IMAPIFolder*      pfldr,
            FOLDERNODE*       pnode,
            FOLDEROPTIONS     opts,
            LPSPropValue      pval
            )_PURE;
    MAPIMETHOD (Connect)(
            DWORD dwReserved,
            SYNCCREDENTIALS* pCredentials
            )_PURE;
    MAPIMETHOD (Disconnect)(
            DWORD dwReserved
            )_PURE;
};
```

Mail application 240 calls the IMailSyncHandler::Install( ) method when installing a new instance of a transport. This method allows the new instance of the transport, to set up any initial registry settings or to create any files necessary for the new instance of the transport. In one actual embodiment, a "profile name" can be passed in the pszProfile parameter, which allows multiple instances of a transport. In practice, this is done to allow, for example, the IMAP transport to be installed twice, once for your corporate mail account, and once for a personel mail account. In this actual implementation of the IMailSyncHandler interface, the profile name is specified in conjunction with Install( ), Uninstall( ), and Initiliaze( ) methods for maintaining several instances of a transport. Also when a transport talks back to the application via the IMailSyncCallback interface, the transport specifies it profile name, so that the application knows the context of the request relative to the transport making the function call (request).

Mail application 240 calls IMailSyncHandler::UnInstall( ) method when removing an instance of a transport. When called, IMailSyncHandler: :Uninstall( ) method removes any values from the registry, and/or removes any mail that the transport may have created, from the mail store.

IMailSyncHandler::Initialize( ) method is used when any transport of transport component 230 is loaded. Mail application 240 calls this method to initialize a transport. Another method, the MailSyncHandler::SetCapability( ) method, is used to modify the behavior of an instance of a transport. For example, mail application 240 might use this method to change the date range of messages that the transport would aquire from the server. Yet another method, IMailSyncHandler::GetCapability( ) method, is used to query a transport setting or capability.

Still another method, IMailSyncHandler::Connect( ) method, is used to instruct the transport to connect to the mail server. IMailSyncHandler::Disconnect( ) method is used to instruct a transport to disconnect from the mail server. The IMailSyncHandler::Synchronize( ) method may be used to instruct a transport to synchronize the local mail store against the remote mail server. The MailSyncHandler::DecodeEvent( ) method is used by the application to decode an event that transport component 230 has logged to the mail application 240 with IMailSyncCallback::LogEvent( ) method. In operation, IMailSyncCallback::LogEvent( ) method allows a transport to log a small packet of data with mail application 240. Mail application 240 would the use a DecodeEvent( ) method to get a human readable description of the event.

The IMailSyncHandler::GetFolderHierarchy( ) method, allows querying the folder hierarchy of the remote mail server. Finally, the IMailSyncHandler::SetFolderOptions( ) method allows setting and querying sync options for folders on the remote mail server.

The above listed code and descriptions are not intended to be exhaustive in nature but are merely intended to clarify specific portions of the present invention and assist in enabling one having ordinary skill in the art to practice the invention.

Figure 5:
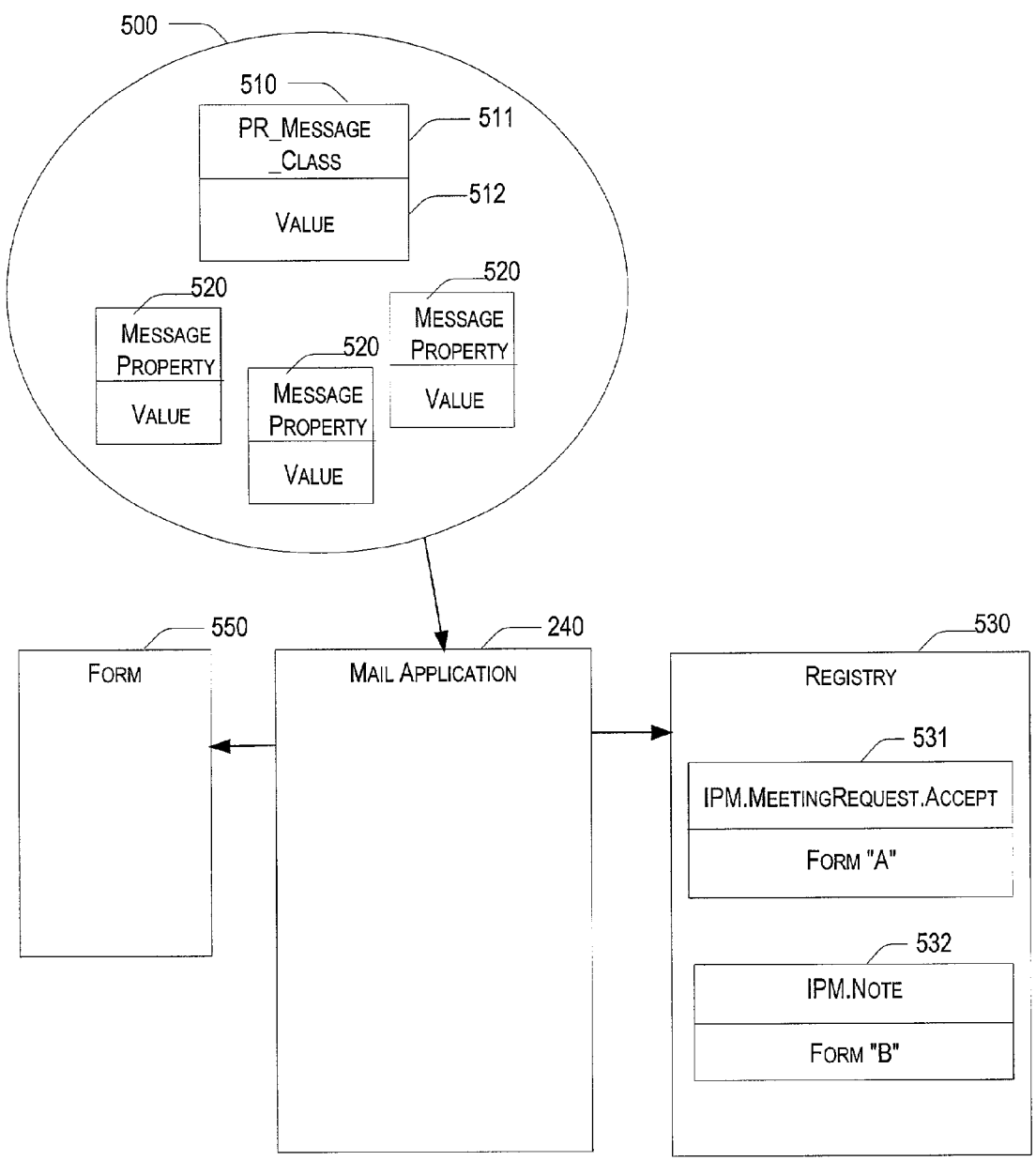
FIG. 5 is a functional block diagram illustrating the evaluation of a message and the instantiation of the appropriate form by the mail application according to one embodiment of the present invention.

FIG. 5 is a functional block diagram conceptually illustrating a process the mail application 240 uses to determine a proper form, to instantiate based on message 500. Form 550 represents one instance of any form within the group of forms 250, including a default form for situations where a specific form is not requested or where a requested form cannot be provided.

Message 500 is a communication message, such as an e-mail message, stored on the mobile device 100. The message 500 includes a class property 510 as well as additional message properties 520. The class property 510 is an object including a property name field 511 and a value field 512. For example, property name field 511 might be PR_MESSAGE_CLASS, which identifies the property, while the corresponding value field 512 might be a text string describing the class of the message. An example of one particular message class might be IPM.MEETINGREQUEST.ACCEPT.

The registry 530 is a registration database containing, among numerous other things, pertinent information relating to the forms of form component 250 registered in the system. The registry 530 includes entries that associate particular message classes with a registered form to handle messages of that particular class. For example, as shown in FIG. 5, Form "A" is registered to handle the IPM.MEETINGREQUEST.ACCEPT message class 531. Likewise, Form "B" is registered to handle the IPM.NOTE message class 532. The registry 530 may be a part of the operating system.

Briefly stated, in operation, mail application 240 determines the appropriate form to instantiate by first locating class property 510 and identifying the message class. Mail application 240 then queries the registry 530 to determine which form is registered to handle the identified message class. Mail application 240 then instantiates the registered form 550 and passes to it the message data.

In the event the message class does not have a registered form, a default form is utilized. For example, IPM.NOTE form handler 532. The default form allows messages received in unregistered forms to be received by the message system and therefore displayed to the user.

Figure 6:
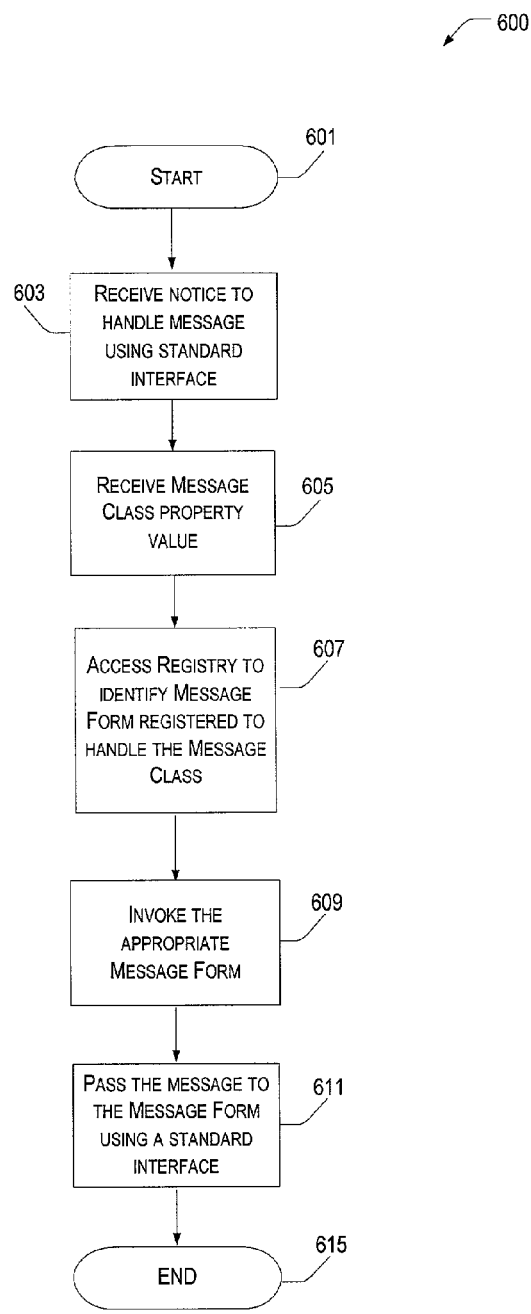
FIG. 6 is a logical flow diagram illustrating a process for accessing a registry to identify a proper form to handle a message class, in accordance with one implementation of the present invention.

FIG. 6 is a logical flow diagram generally illustrating a process for accessing a registry to identify the proper form to handle a message class. In describing FIG. 6, reference is made to the system described in conjunction with FIGS. 2 and 5. Method 600 enters at starting block 601, where message data typically is already available, such as, for example, at transport component 230 or stored within the data store 220.

The process begins at block 603 where, for example, one or more components, such as the transport component 230, notifies mail application 240 that the component has message data to pass to a message form 250. At block 605, the mail application 240 retrieves the class property 510 from the message data, as described above in conjunction with FIG. 5.

At block 607, mail application 240 accesses the registry 530 to identify the appropriate message form 550 registered to handle the message class. In the event there is not a form registered to handle the identified message class, the registry may identify a default form handler to mail application 240.

At block 609, mail application 240 invokes the identified form 550. At block 611, mail application 240 passes the message properties to the message form 250 using a standard interface, as described above. At block 615, processing ends. At this point the message data has been passed to the appropriate message form 250. It should be noted that this process may be used by any component in the messaging system 200 that communicates with mail application 240, and requires a form 550.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable medium on a mobile computing device having computer-executable components for managing a message within a mobile device, comprising:
   a main application executing on a mobile device and in communication with a messaging component of the mobile device and a table of the mobile device, wherein the table of the mobile device includes a listing of class identifiers that each describe a class of message, each class identifier being associated with a corresponding message form, wherein:
      the messaging component is configured to receive a first message that is specifically formatted for communication with the messaging component,
      the first message is associated with a class identifier that distinguishes the first message from other messages formatted for communication with a different messaging component, the messaging component is configured to pass a notice to handle the first message to the main application using a standard interface, the notice is in a standardized message format and includes the class identifier associated with the first message, the main application is configured to query the table to identify a message form registered to handle messages associated with the class identifier such that the identified message form is configured to handle messages formatted for communication with the message component, the main application is configured to instantiate the identified message form, pass the first message to the instantiated message form and display the instantiated message form with the first message, the messaging component is further configured to receive a second message and pass the second message to the instantiated message form, and the main application is further configured to display the instantiated message form with the second message without having to create a new message form, wherein the first message is not displayed with the instantiated message form.

2. The computer-readable medium of claim 1, wherein the messaging component comprises a message transport.

3. The computer-implemented medium of claim 1, wherein the messaging component comprises a storage component.

4. The computer-implemented medium of claim 1, further comprising another messaging component that communicates with the messaging component and the main application using the standard interface.

5. The computer-readable medium of claim 1, wherein the class identifier is one identifier in a plurality of hierarchically structured class identifiers.

6. The computer-readable medium of claim 1, wherein the table further includes a default message form that is returned when the class identifier is not in the listing of class identifiers.

7. The computer-readable medium of claim 1, wherein the table comprises a system registration database.

8. A computer-readable medium on a mobile computing device having computer-executable instructions for performing steps, comprising:

receiving a first message over a transport interface of the mobile computing device, wherein the first message is specifically formatted for communication with the transport interface, and further wherein the first message is associated with a class identifier that identifies the transport interface for which the first message is formatted;

receiving over a standard interface of the mobile computing device a notice to handle the first message, wherein the standard interface is configured to receive the notice in a standardized message format;

retrieving the class identifier from the first message, wherein the class identifier distinguishes the first message from other messages formatted for communication with a different transport interface of the mobile computing device;

accessing a registry to identify a message form registered to handle messages having the retrieved class identifier, wherein the identified message form is configured to handle messages formatted for communication with the transport interface, wherein the registry includes a listing of class identifiers that each describe a class of message, each class identifier being associated with a corresponding message form;

instantiating the identified message form;

passing the first message to the instantiated message form;

displaying the instantiated message form with the first message;

receiving a second message over the transport interface;

passing the second message to the instantiated message form; and displaying the instantiated message form with the second message without having to create a new message form, wherein the first message is not displayed with the instantiated message form.

9. The computer-readable medium of claim 8, wherein the notice to handle the first message comprises an instruction to display the message on the mobile computing device.

10. The computer-readable medium of claim 8, wherein the class identifier is stored within a property of the first message.

11. The computer-readable medium of claim 8, wherein the registry further includes a default message form that is returned when the class identifier is not in the listing of class identifiers.

12. A system for managing communication messages on a mobile device, comprising:

a message form object of a mobile device having a first standardized interface for communicating information with other components in the system of the mobile device, wherein:

the message form object handles communication messages associated with a class identifier, and the class identifier identifies a message transport for which the communication message is formatted;

an application having a second standardized interface for communicating information with other components in the system, wherein:

the application is configured to identify and instantiate the message form object that is registered to handle a first communication message received by the system based on the associated class identifier, wherein the message form object is registered in a registry of the mobile device having a plurality of message from objects associated with a plurality of identifies, and the class identifier distinguishes the first communication message from other communication messages formatted for communication with a different message transport; and a message transport having a third standardized interface for communicating information with other components in the system, wherein:

the message transport receives the first communication message that is specifically formatted for communication with the message transport, the message transport is configured to pass the first communication message associated with the class identifier to the message form object, the message form object is configured to handle communication messages formatted for communication with the message transport, the application is further configured to display the instantiated message form object with the first communication message, the message transport is further configured to receive a second communication message and pass the second communication message to the instantiated message form object, and the application is further configured to display the instantiated message form object with the second communication message without having to create a new message form object, wherein the first communication message is not displayed with the instantiated message form object.

13. The system of claim 12, wherein the first standardized interface includes means for instructing the message form object to perform actions.

14. The system of claim 13, wherein the first standardized interface comprises an ImessageForm interface.

15. The system of claim 13, wherein the first standardized interface comprises an IFormProvider interface.

16. The system of claim 12, wherein the second standardized interface includes means for instructing the application to perform actions.

17. The system of claim 16, wherein the second standardized interface comprises an ImessageFormHost interface.

18. The system of claim 16, wherein the second standardized interface comprises an IMailSyncCallBack interface.

19. The system of claim 12, wherein the third standardized interface includes means for instructing the message transport to perform actions.

20. The system of claim 19, wherein the third standardized interface comprises a IMailSyncHandler interface.

* * * * *